United States Patent [19]

Wang

[11] Patent Number: 4,939,227

[45] Date of Patent: Jul. 3, 1990

[54] NOVEL THERMOPLASTIC POLYMERS

[75] Inventor: Pen-Chung Wang, Houston, Tex.

[73] Assignee: Shell Oil Company, Houston, Tex.

[21] Appl. No.: 351,370

[22] Filed: May 15, 1989

[51] Int. Cl.$^5$ .................... G08G 59/26; G08G 59/28; G08G 59/62

[52] U.S. Cl. ...................................... 528/96; 528/117; 528/370

[58] Field of Search .................... 528/96, 117

[56] References Cited

U.S. PATENT DOCUMENTS

| | | | |
|---|---|---|---|
| 3,676,397 | 7/1972 | Clarke | 528/96 |
| 3,963,667 | 7/1976 | Schreiber et al. | 260/37 EP |
| 4,071,477 | 1/1978 | Seltzer et al. | 260/2 N |
| 4,209,608 | 6/1980 | Bateman | 528/363 |
| 4,210,744 | 7/1980 | Bateman | 528/363 |
| 4,368,314 | 1/1983 | Endo et al. | 528/96 X |
| 4,631,331 | 12/1986 | Parker | 528/96 |
| 4,656,294 | 4/1987 | Kanayama | 528/96 X |
| 4,672,101 | 6/1987 | Wang et al. | 528/96 |
| 4,707,533 | 11/1987 | Hefner | 528/96 |
| 4,716,204 | 12/1987 | Parker | 528/96 X |

*Primary Examiner*—Earl Nielsen

[57] ABSTRACT

Novel thermoplastic polymers comprise (1) moieties of a 1,6-diaza [4.4] spirodilactam having oxyaryl-containing substituents on the spiro ring nitrogen atoms, or, optionally, moieties of a di(oxyphenyl)compound, alternating with moieties derived from a mono- or binuclear hydantoin, the differing moieties being connected by 2-hydroxy-1,3-propylene linking groups.

31 Claims, No Drawings

NOVEL THERMOPLASTIC POLYMERS

FIELD OF THE INVENTION

This invention relates to a novel class of thermoplastic polymers containing a number of different types of cyclic structures within the polymeric chain. More particularly, it relates to thermoplastic polymers which incorporate moieties derived from a hydroxyaryl-substituted 1,6-diaza [4.4] spirodilactam, optionally, moieties derived from a di(hydroxyphenyl) compound, and moieties of a hydantoin, the differing moieties being connected by 2-hydroxypropylene linking groups.

BACKGROUND OF THE INVENTION

The class of thermoplastic polymers is well known in the art, in part because of the useful characteristic of many of such materials of being heat deformable at relatively low temperatures. Such thermoplastics are processed by conventional methods such as extrusion, injection molding or thermoforming into films, sheets, fibers or molded articles of established utility. However, the low temperature deformation property that makes many thermoplastics useful often serves to preclude the application of such materials where higher temperatures are likely to be encountered. Moreover, continued exposure to elevated temperatures often results in thermal degradation of the thermoplastic.

Many thermoplastics are produced in a manner designed to provide a relatively high molecular weight so as to increase the melting point or softening temperature of the thermoplastic. An alternate approach to solving the problem of poor high temperature performance is through the use of polymers which incorporate cyclic or polycyclic structures within the molecular structure.

An increase in molecular weight to improve initial processing properties is illustrated by Bateman, U.S. Pat. No. 4,210,744, where hydantoin trisepoxides are reacted with binuclear hydantoins. A similar reaction employing hydantoin diepoxides is shown by Bateman, U.S. Pat. No. 4,209,608. The diglycidyl derivatives of hydantoins are further described by Seltzer et al, U.S. Pat. No. 4,071,477 and references cited therein. Adducts of polyglycidyl hydantoins and organic compounds of more than one active hydrogen atom are shown by Schreiber et al, U.S. Pat. No. 3,963,667. The active hydrogen compounds include amines, carboxylic acids and polyphenols, particularly commercially available polyphenols such as 2,2-di(4-hydroxyphenyl)propane, also referred to as bisphenol A or BPA. It would be of advantage, however, to provide other reaction products of polyhydric phenolic compounds and hydantoins which have relatively high glass transition temperatures and good properties.

SUMMARY OF THE INVENTION

This invention provides a novel class of thermoplastics which incorporate a plurality of types of cyclic structures within the polymer molecule. More particularly, the present invention relates to certain novel thermoplastics wherein (1) moieties derived from a 1,6diaza[4.4] pirodilactam having a hydroxyaryl substituent on each spiro ring nitrogen atom and, optionally, moieties derived from a diglycidyl derivative of a di(hydroxyphenyl)compound, alternate with (2) moieties derived from a hydantoin, such differing moieties being connected by 2-hydroxy-1,3-propylene linking groups.

DESCRIPTION OF THE INVENTION

The present invention comprises polymers wherein one component of the reaction mixture employed for the production thereof is a diglycidyl derivative of a 1,6-diaza [4.4] spirodilactam having hydroxyaryl substituents on the spiro ring nitrogen atoms. Such glycidyl derivatives are typically produced by reaction of an epihalohydrin and the and the corresponding hydroxyaryl-substituted spirodilactam. Although a wide variety of spirodilactams are useful as precursors of the glycidyl derivatives employed to produce the polymers of the invention, a preferred class of spirodilactams is represented by the formula

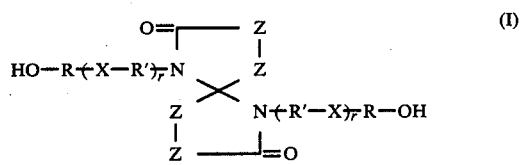

wherein R independently is aromatic of up to 15 carbon atoms and up to two aromatic rings, inclusive, R' independently is R or aliphatic of up to 10 carbon atoms inclusive, r independently is 0 or 1, X independently is a direct valence bond, alkylene of up to 8 carbon atoms inclusive, oxy, thio, sulfonyl, carbonyl, dioxyphenylene, 2,2-di(oxyphenyl)propane, di(oxyphenyl) sulfone or dioxydiphenylene, and Z independently is $>C(Z')_2$ in which Z' independently is hydrogen, lower alkyl of up to 4 carbon atoms inclusive, preferably methyl, halo, preferably the lower halogens fluoro or chloro, or aryl, preferably phenyl, or Z is such that two adjacent Z groups taken together form a ring system Z" of from 5 to 7 ring atoms up to two of which are heteroatoms selected from nitrogen, oxygen or sulfur with the remainder of the ring atoms being carbon atoms, there being up to 15 carbon atoms in each Z", two of which form a bridge between the carbon atoms connected by the adjacent Z groups. R and R' independently are hydrocarbyl containing only atoms of carbon and hydrogen or are substituted hydrocarbyl additionally containing atoms such as halogen, preferably the middle halogens chloro or bromo, as inert monovalent carbon atom substituents.

The various modifications of the spirodilactams of formula I will be apparent from the above formula and the description of the components thereof. However, by way of further illustration, in the embodiment where the spirodilactam ring substituents are not a part of a fused ring system and are therefore acyclic, i.e., Z is $>C(Z')_2$, illustrative hydroxyaryl-substituted spirodilactams include 1,6-di(4-hydroxyphenyl)-1,6-diazaspiro[4.4]nonane-2,7-dione, 1,6-di(3-hydroxy-4-chlorophenyl)-3,8-dimethyl-1,6-diazaspiro[4.4]nonane-2,7-dione, 1,6-di[4-(4-hydroxyphenyloxy)phenyl-1,6-diazaspiro[4.4]nonane-2,7-dione, 1,6-di[4-(3-hydroxybenzoyl)phenyl] 1,6-diazaspiro[4.4]nonane-2,7-dione; 1,6-di(4-hydroxyphenyl)3,3,4,4,8,8,9,9-octamethyl-1,6-diazaspiro[4.4]nonane-2,7-dione, 1,6-di[4-(4'-hydroxybiphenyl)]-3,4-diphenyl-1,6-diazaspiro-[4.4]nonane-2,7-dione, 1,6-di[2-(4-hydroxylphenyl)propyl]-1,6-diazaspiro[4.4]nonane-2,7-dione, 1,6-di[4-(4-hydroxylphenylisopropyl) phenyl]-1,6-diazaspiro[4.4]nonane- 2,7-dione and 1,6-di(4-hydroxyphenyl)3,4,8,9-tetra-fluoro-1,6-diazaspiro[4.4]nonane-2,7-dione. In the modification wherein the adjacent Z groups of each spiro ring form a cyclic fused ring substituent, i.e., the adjacent Z groups are Z", illustrative spirodilactams include 1,6-di(hydroxyphenyl)-3,4,8,9-dibenzo-1,6-diazaspiro[4.4]nonane-2,7-dione, 1,6-di(3-hydroxyphenyl)-3,4,8,9-di(pyrido)-1,6-diazaspiro-nonane-2,7-dione and 1,6-di[4-(4-hydroxy phenyloxy)phenyl]-3,4,8,9-di(cyclopentano)-1,6-diazaspiro[4.4]nonane-2,7-dione. Also suitable are those spirodilactams wherein one spiro ring has a cyclic fused ring substituent and one spiro ring is free of fused ring substituents, e.g., 1,6-di(4-hydroxyphenyl)-3,4-benzo-8-methyl-1,6-diazaspiro[4.4]nonane-2,7-dione and 1,6-di[4-hydroxynaphthyl)]-3,4-cyclopentano-1,6-diazaspiro[4.4]nonane-2,7-dione.

In general, the compounds of the above formula I are preferred when R and R' are aromatic and hydrocarbyl, particularly such compounds wherein each r is 0. The class of 1,6-di(hydroxyphenyl) spirodilactams is particularly preferred, especially the 1,6-di(4-hydroxyphenyl) spirodilactams. Within the spirodilactam portion of the molecule, spirodilactams wherein both spiro rings are free from fused ring substituents are preferred as are those spirodilactams wherein both spiro rings have a cyclic, fused ring substituent. The compound 1,6-di(4-hydroxyphenyl)-1,6-diazaspiro[4.4]nonane-2,7-dione is an especially preferred member of the former class and 1,6-di(4-hydroxyphenyl)-3,4,8,9-dibenzo-1,6-diazaspiro[4.4]nonane-2,7-dione is especially preferred among members of the latter class.

The hydroxyaryl-substituted spirodilactam of formula I are compounds which are described in more detail in copending U.S. patent application Ser. No. 245,618, filed Sept. 16, 1988. The general method of production of the hydroxyaryl-substituted spirodilactams, also described and claimed in this copending application as well as in copending U.S. patent applications Ser. No. 172,000 filed Mar. 23, 1988, now abandoned, and 172,052, filed Mar. 23, 1988 now abandoned each of which is incorporated herein by reference, is by the reaction of at least one hydroxy-containing primary amino compound and a spirodilactam precursor. In terms of the spirodilactams of formula I, the hydroxy-containing primary amine compound is represented by the formula $$H_2N-(R'-X)_r-R-OH \quad (II)$$

wherein R, R', r and X have the previously stated meanings. One type of spirodilactam precursor, in terms of the spirodilactams of formula I is a 4-oxoheptandioic acid compound represented by the formula

  (IIIa)

wherein A independently is hydroxy, lower alkoxy of up to 4 carbon atoms inclusive or halo, preferably middle halo, and Z has the previously stated meaning. Alternatively, the spirodilactam precursor is a spirodilactone represented by the formula

wherein Z has the previously stated meaning.

The amino compound of formula II and the spirodilactam precursor of formula IIIa or IIIb are contacted in a molar ratio of about 2:1 at reaction conditions in a liquid phase in the presence of a reaction diluent. Suitable diluents are polar, are inert to the reactants and product and are capable of dissolving at least a portion of each reactant at reaction temperature. Particularly useful reaction diluents are N-alkylamides such as N,N-dimethylacetamide or N-methyl-2-pyrrolidone. Reaction temperatures are generally from about 85° C. to about 250° C. and reaction pressures are sufficient to maintain the reaction mixture in a liquid phase. Such pressures are up to about 20 atmospheres. Subsequent to reaction, the hydroxyaryl-substituted spirodilactam product is recovered by conventional methods such as precipitation or solvent removal. Alternatively, the spirodilactam is further reacted in situ without the need for isolation.

The glycidyl derivative of the hydroxyaryl-substituted spirodilactam employed as a reactant in the process of the invention is produced by reaction of the spirodilactam of formula I with an epihalohydrin. While epihalohydrin wherein the halo moiety is fluoro, chloro, bromo or iodo are satisfactory the preferred epihalohydrin are those wherein the halo is middle halo, i.e., epichlorohydrins or epibromohydrin, particularly epichlorohydrin.

The substituted spirodilactam and the epihalohydrin are reacted by employing the methods conventionally employed in the production of glycidyloxy derivatives of phenolic compounds. The epihalohydrin is provided in a molar ratio of at least 2:1 as compared with the hydroxyaryl-substituted spirodilactam, and frequently in a considerably higher ratio in order to permit the epihalohydrin to serve as a reaction diluent as well as a reactant. Alternatively, other reaction diluents are suitably employed, e.g., alkylated aromatic diluents such as toluene or xylene, so long as the diluent will dissolve at least a portion of each reactant at reaction temperature and is inert to the reactants and the epoxy-containing reaction product. The glycidyl derivatives are produced by contacting the epihalohydrin and the spirodilactam under reaction conditions, typically a reaction temperature of about 80° C. to about 180° C. and a reaction pressure from about 1 atmosphere to about 20 atmospheres. The initial reaction produces a reaction intermediate which, without isolation, is reacted with an at least stoichiometric quantity of a strong base, typically aqueous sodium hydroxide or potassium hydroxide, while the water present or formed is removed by distillation at conditions of approximately the normal boiling temperature of the mixture at ambient temperature.

Particularly good results are obtained when the reaction of the epihalohydrin and the spirodilactam is conducted in the presence of a quaternary phosphonium salt as catalyst, particularly a phosphonium salt wherein the substituents on the phosphorus are lower alkyl or phenyl. Alkytriphenylphosphonium salts, particularly ethyltriphenylphosphonium bromide or iodide, are a preferred class of quaternary phosphonium salts to be used as catalyst. Subsequent to reaction, the glycidyloxyaryl-substituted spirodilactams are recovered from the reaction mixture by well known techniques such as extraction or precipitation. This two-step process is entirely conventional for the production of the glycidyloxy derivative of 2,2-di(4-hydroxyphenyl)propane, a commercially available epoxy compound.

The glycidyloxy-substituted spirodilactams are illustratively produced by the replacement of the hydroxy hydrogen of the hydroxyaryl-substituted spirodilactam of formula I with glycidyl groups, i.e.,

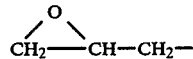

groups. Such glycidyloxyaryl-substituted spirodilactams are represented by the formula

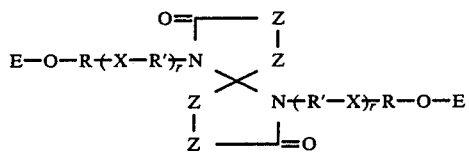

(IV)

where R, R', r, X and Z have the previously stated meanings and E is glycidyl.

The identity of specific glycidyl-containing spirodilactams of the above formula IV will be apparent from the above formulas for the reactants and product and the accompanying description of the reactants. However, illustrative glycidyloxyaryl-substituted spirodilactams include 1,6-di(4-glycidyloxphenyl)-1,6-diazaspiro[4.4]nonane-2,7-dione, 1,6-di[4-(4-glycidyloxyphenyloxy)phenyl]-3,8-dimethyl-1,6-diazaspiro[4.4]-nonane-2,7-dione, 1,6-di[4-(4-glycidyloxyphenylisopropyl)phenyl]-3,4,8,9-dibenzo-1,6-diazaspiro[4.4]nonane-2,7-dione, 1,6-di[4-(3-glycidyloxybenzoyl)phenyl]-3,4-cycohexano-8-methyl-1,6-diazaspiro[4.4-]nonane-2,7-dione.

These glycidyloxyaryl-substituted spirodilactams are described in greater detail and are claimed as compositions of matter in copending U.S. patent applications Ser. No. 172,054, filed Mar. 23, 1988, now abandoned and Ser. No.245,434, filed Sept. 16, 1988, now U.S. Pat. No. 4,895,942 incorporated herein by reference.

The optional reactant in the process of the invention is the diglycidyl ether of a di(hydroxyphenyl)alkane. Although a variety of such bisphenolic compounds are useful as the optional reactant in the process of the invention, the preferred di(glycicyloxyphenyl)alkane reactants are represented by the formula

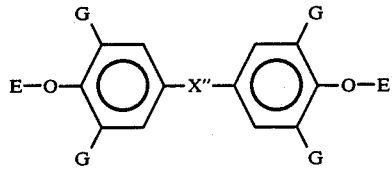

(V)

where E has the previously stated meaning, X" is a direct valence bond, alkylene of up to 8 carbon atoms, oxy, thio, sulfonyl or carbonyl, and G independently is hydrogen, lower alkyl or halo, preferably middle halo.

Illustrative of the glycidyloxyphenyl alkanes of formula V are 2,2-di(4-glycidyloxyphenyl)propane, 2,2-di(4-glycidyloxy-3-methylphenyl)methane, 2,2-di(4-glycidyloxy-3-chlorophenyl)propane, 2,2-di(4-glycidyloxy-3,5-dibromphenyl)propane, 2-(4-glycicyloxyphenyl), (4-glycidyloxy-3-bromophenyl)ether and di-(4-glycidyloxy-3,5-dibromophenyl)ketone. The preferred compound of formula V is that in which each G is hydrogen, and X' is 2,2-propylene, i.e., 2,2-di(4-glycidyloxyphenyl)propane. Such compounds of formula V are known compounds or are produced by known methods.

The hydantoin reactant is a mono- or binuclear diazacyclopentanedione of the formula

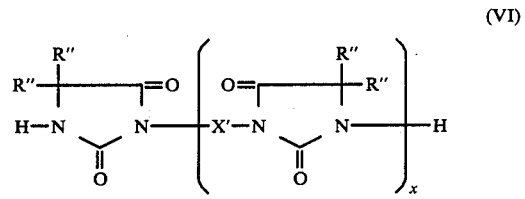

(VI)

wherein R" independently is hydrogen, alkyl of up to 10 carbon atoms inclusive, aryl of up to 12 carbon atoms and up to two aromatic rings, inclusive, or the two R" groups attached to the same carbon atom together are tetramethylene or pentamethylene, X' is X or halo-X wherein each halo is middle halo, and x is 0 or 1. These hydantoins are known compounds or are produced by known methods. The mononuclear hydantoins, i.e., the compounds of the above formula VI wherein x is 0, are produced by the well-known method of reacting an appropriately substituted ketone with sodium cyanide and ammonium carbonate. The binuclear hydantoins, i.e, the compounds of formula VI wherein x is 1, are formed by methods such as are described by Bateman, U.S. Pat. No. 4,210,744 and references cited therein.

Illustrative of the mononuclear hydantoins are hydantoin, 5-methylhydantoin, 5,5-dimethylhydantoin, 5-methyl-5-ethylhydantoin, 5-phenylhydantoin, 5-octylhydantoin, 5,5-diphenylhydantoin, 5,5-di-n-hexylhydantoin, 1,3-diazaspiro[4.5]decane-2,4-dione and 1,3-diazaspiro[4.4]nonane2,4-dione. The binuclear hydantoins are exemplified by methylenebis(5,5-dimethylhydantoin), 1,4-butylenebis(5-methyl-5-octylhydantoin), 4,4'-biphenylenebis(5-phenylhydantoin, oxybisphenylene(5-methyl-5-decylhydantoin) and 2-chloro-1,5-hexylenebis(hydantoin).

The polymer of the invention is produced by contacting the hydantoin reactant, the glycidyloxyaryl-substituted spirodilactam and, if present, the glycidyloxyphenyl compound-reactant, under reaction conditions. A typical reaction temperature is from about 80° C. to about 250° C., but preferably is from about 100° C. to about 200° C. The reaction pressure is from about 1 atmosphere to about 20 atmospheres. The polymerization reaction is conducted in the liquid phase in the presence of an inert reaction diluent. Suitable reaction diluents include N-alkylamides such as N,N-dimethylacetamide, N,N-dimethylformamide or N-methyl-2-pyrrolidone, alkylated benzenes such as toluene, xylene or ethylbenzene and sulfur-containing diluents such as dimethyl sulfoxide or sulfolane.

The presence in the reaction mixture of a di(-glycidyloxyphenyl)compound reactant is, of course, optional and is not required, but when present the optional reactant is present in a molar quantity of up to nine times the molar quantity of the glycidyloxyaryl-substituted spirodilactam, preferably in a molar quantity up to twice that of the substituted spirodilactam. The hydantoin reactant is preferably provided in a molar quantity at least equal to the total molar quantity of the other reactant although in practice molar ratios of from about 3:1 to about 1:3 are satisfactory in the reaction mixture. During the polymerization reaction the reactant contact is maintained by conventional methods such as shaking or stirring and subsequent to reaction the polymer product is recovered by such methods as precipitation or solvent removal.

The polymer product comprises a linear alternating polymer of segments in which the hydantoin reactant has entered the reaction at each of the hydrogens attached to ring nitrogen atoms, which hydrogens serve to open the ring of the glycidyl portion of the glycidyloxyaryl-containing spirodilactam or, if present, the glycidyloxyphenylpropane. From the reaction of the hydantoin hydrogen and the glycidyl moiety results a 2-hydroxy-1,3-propylene group which serves to link the hydantoin through the nitrogen on which the hydrogen was attached and to the oxygen of the oxyaryl substituent of the spirodilactam on which the glycidyl group was located, or the oxygen of a di(oxyphenyl)propane to which the glycidyl group was attached if the optional 2,2-di(4-glycidyloxyphenyl) propane was present. In the case of the polymers of the invention which are copolymers, i.e., no di(glycidyloxyphenyl)propane reactant was present during polymerization, the polymer product is represented by a repeating first segment of the formula pane reactant, the resulting polymer is a terpolymer and additionally incorporates a second segment of the formula

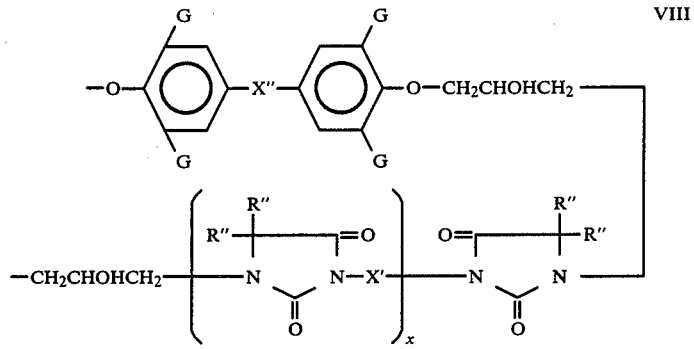

VIII wherein G, R", X', X" and x have the previously stated meanings. Within the terpolymer product the segments of formula VII and VIII are found randomly along the terpolymer chain with the molar quantity of the second segment (formula VIII) being up to about nine times the molar quantity of the first segment (formula VII), but preferably from about twice to about half of the molar quantity of the first segment. The identity and nomenclature of the polymer products is difficult to precisely determine because of the complexity thereof, but an illustrative copolymer will contain units of 1,6-di(4-oxyphenyl)-1,6-diazaspiro[4.4]-nonane-2,7-dione alternating with units of 5,5-dimethylhydantoin, less the hydrogens attached to the ring nitrogen atoms, the units being connected by 2-hydroxy-1,3-propylene linking groups, produced by reaction of 1,6-di(4-glycidyloxyphenyl)-1,6-diazaspiro[4.4]nonane-2,7-dione and 5,5-dimethylhydantoin. The polymer will also contain units of 2,2-di(4-oxyphenyl)propane when 2,2-di(4-glycidyloxyphenyl)propane was present in the reaction mixture. Although the copolymers and the terpolymers of the invention are both useful as thermoplastics and have good properties, the copolymers are generally preferred over the corresponding terpolymers, in part because of a higher glass transition temperature. Of particular interest are the copolymers and terpolymers of molecular weight from about 1,000 to about 100,000.

The polymer products of the invention are thermoplastics and have the utilities normally associated with thermoplastic polymers. The products are processed by methods conventional for thermoplastics such as extru-

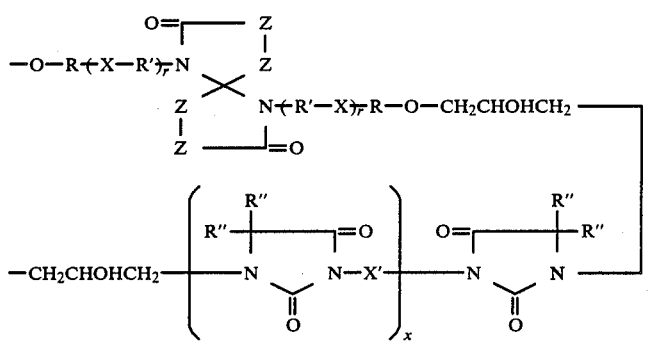

VII wherein R, R', R", r, X, X', x and Z have the previously stated meaning. When the polymerization reaction mixture additionally contains di(glycidyloxyphenyl)prosion and injection molding into films, fibers, sheets and molded articles of established utility. Additionally, however, the products of the invention, because of relatively high glass transition temperatures, are useful as engineering thermoplastics for applications where elevated temperatures are likely to be encountered. Among such applications are containers for food and drink and base materials for the electric and electronic industries.

The invention is further illustrated by the following Illustrative Embodiment which should not be construed as limiting the invention.

Illustrative Embodiment

A mixture of 0.64 g (0.005 mole) of 5,5-dimethylhydantoin, 2.25 g (0.005 mole) of 1,6-di(4-glycidyloxyphenyl)-1,6-diazaspiro-[4.4]nonane-2,7-dione and 0.093 g (0.00028 mole) of ethyltriphenylphosphonium bromide is placed in a 50 ml resin pot equipped with a mechanical stirrer and a condenser. The mixture was warmed to 200° C. and maintained at that temperature for 6 hours. The resulting mixture was cooled and the product was isolated as a hard resin with a glass transition temperature of 150° C.

What is claimed is:

1. A thermoplastic polymer comprising (1) units of a 1,6-diaza [4.4] spirodilactam having oxyaryl substituents on the spiro ring nitrogen atoms, or optionally, di(oxyphenyl)compound, alternating with (2) units derived from a mono- to binuclear hydantoin by loss of hydrogens from the ring nitrogen atoms, the differing units being connected by 2-hydroxy-1,3-propylene linking groups.

2. The polymer of claims 1 having a first repeating segment of the formula first segment of the formula

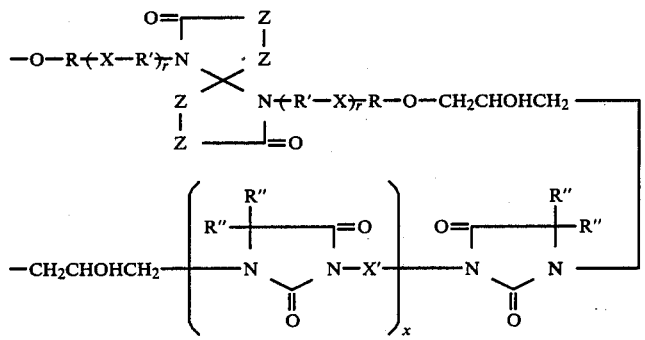

and up to nine times the molar quantity of the first segment of a second repeating segment of the formula

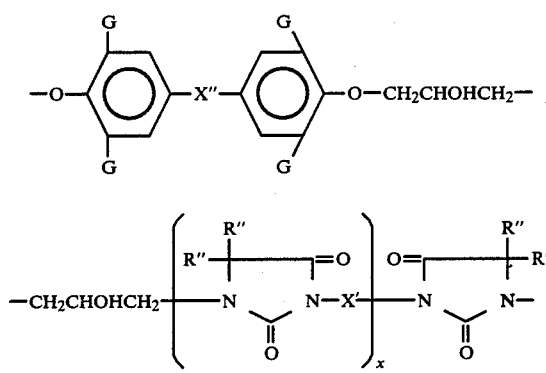

wherein R is aromatic of up to 15 carbon atoms and up to two aromatic rings, inclusive, R' is R or aliphatic of up to 10 carbon atoms, inclusive, r is 0 or 1, X is a direct valence bond, alkylene of up to 8 carbon atoms inclusive, oxy, thio, sulfonyl, carbonyl, dioxyphenylene, 2,2-di(oxypheynl)propane, di(oxyphenyl) sulfone or dioxydiphenylene, Z independently is C(Z)$_2$ in which Z is hydrogen, lower alkyl or lower halo, or Z is such that two adjacent Z groups taken together form a ring system Z" of from 5 to 7 ring atoms up to two of which are heteroatoms selected from nitrogen, oxygen or sulfur with the remainder of the ring atoms being carbon atoms, there being up to 15 carbon atoms in each Z", two of which form a bridge between the carbon atoms connected by the adjacent Z groups, R" is hydrogen, alkyl of up to 10 carbon atoms inclusive, aryl of up to 12 carbon atoms and up to 2 aromatic rings, inclusive, or he two R" groups attached to the same carbon atom taken together are tetramethylene or pentamethylene, X' is X or halo-X where each halo is middle halo, X" is a direct valence bond, alkylene of up to 8 carbon atoms, inclusive, oxy, thio, sulfonyl or carbonyl, x is 0 or 1 and G is hydrogen, lower alkyl or middle halo.

3. The polymer of claim 2 wherein the polymer is a copolymer.

4. The copolymer of claim 3 wherein R and R' are aromatic and hydrocarbyl.

5. The copolymer of claim 4 wherein x is 0.

6. The copolymer of claim 5 wherein r is 0.

7. The copolymer of claim 6 wherein Z is C(Z')$_2$.

8. The copolymer of claim 7 wherein R" is hydrogen or alkyl.

9. The copolymer of claim 8 wherein R is phenylene.

10. The copolymer of claim 9 wherein Z' is hydrogen.

11. The copolymer of claim 10 wherein R is p-phenylene.

12. The copolymer of claim 6 wherein adjacent Z groups are Z".

13. The copolymer of claim 12 wherein R" is hydrogen or alkyl.

14. The copolymer of claim 13 wherein Z" is benzo.

15. The copolymer of claim 14 wherein R is phenylene.

16. The polymer of claim 2 wherein the polymer is a terpolymer.

17. The terpolymer of claim 16 wherein G is halo.

18. The terpolymer of claim 17 wherein G is bromo.

19. The terpolymer of claim 16 wherein G is hydrogen.

20. The terpolymer of claim 19 wherein R and R' are aromatic and hydrocarbyl.

21. The terpolymer of claim 20 wherein x is 0.

22. The terpolymer of claim 21 wherein r is 0.

23. The terpolymer of claim 22 wherein Z is C(Z')$_2$.

24. The terpolymer of claim 23 wherein R'' is hydrogen or alkyl.

25. The terpolymer of claim 24 wherein R is phenylene.

26. The terpolymer of claim 25 wherein Z' is hydrogen.

27. The terpolymer of claim 26 wherein R is p-phenylene.

28. The terpolymer of claim 22 wherein adjacent Z groups are Z''.

29. The terpolymer of claim 28 wherein R'' is hydrogen or alkyl.

30. The terpolymer of claim 29 wherein Z'' is benzo.

31. The terpolymer of claim 30 wherein R is phenylene.

* * * * *